Inventor:
Johan Anshelm Granstedt
by George Bryand Jones
Attorney.

Patented Oct. 11, 1932

1,882,418

UNITED STATES PATENT OFFICE

JOHAN ANSHELM GRANSTEDT, OF SJALEVAD, SWEDEN, ASSIGNOR OF ONE-HALF TO GUNNAR PER OLOF FOGELQVIST, OF SUNDSVALL, SWEDEN

CENTRIFUGAL CLUTCH

Application filed June 30, 1930, Serial No. 464,826, and in Sweden April 1, 1930.

The present invention relates to a centrifugal clutch of the kind in which the one clutch member consists of a wing wheel or the like, and the other clutch member consists of a rotatable casing which surrounds said wing wheel, and which is completely or partially filled with a pulverous, granular, or similar substance.

The invention is characterized in that the casing has an oval or other non-circular shape in cross section.

Figure 1:
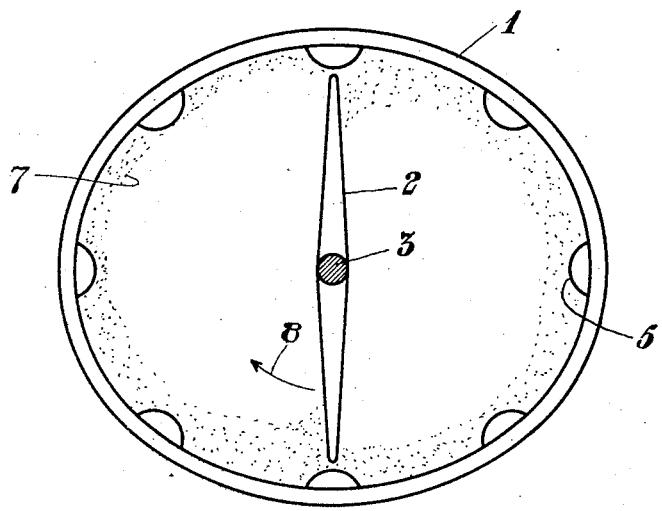
Figure 2:
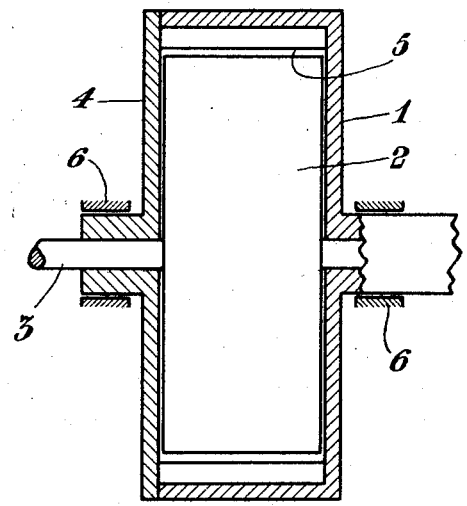

An embodiment of the invention is illustrated in the accompanying drawing, in which Fig. 1 shows a clutch according to the invention viewed in the axial direction and with one end of the casing removed, and Fig. 2 shows the clutch in axial section.

The clutch consists of a rotatable casing 1 which may be supported in suitable bearings diagrammatically indicated at 6 in the drawing, and of a wing wheel 2 rotatably supported in the casing and consisting, in the embodiment illustrated, of two wings secured in suitable manner to the shaft 3. The shaft 3 is rotatably journalled in the casing 1, and for inserting the wing wheel in the casing one end wall 4 of the casing is removable, as indicated in the drawing. The hollow interior of the drum is filled entirely or partially with a pulverous, granular, or similar substance 7.

As shown in Fig. 1, the casing 1 does not have a circular shape. In the embodiment illustrated the casing has the shape of an ellipse or an oval in cross section or axial projection.

Assuming the shaft 3 to be the driving shaft and that said shaft is caused to rotate in the direction indicated by the arrow 8 in Fig. 1, while the casing is connected to the driven shaft or member and is at rest initially, the powder or the like contained in the casing will form an obstacle to free movement of the wings in the casing, so that the casing will be gradually forced to follow the movement of the wings and will thus be entrained in the rotation. The centrifugal force will, of course, tend to retain the powder particularly in the portions of the casing farthest remote from the center of rotation, that is to say, at the ends of the transverse axis of the oval or ellipse, so that the resistance to the movement of the powder relatively to the casing caused by the wing wheel becomes increased, whereby the casing is rapidly entrained in the rotation, particularly as said resistance is increased upon an increase in the rotational speed of the casing. The function is, of course, the same if the casing is connected to the driving shaft and is caused to rotate, while the wing wheel is at rest initially. In order further to increase the resistance to movement of the powder relatively to the casing, said casing may be provided on its inside with ribs or ridges 5, but these are not essential.

It will be understood that the invention is not limited to the embodiment above described and illustrated in the drawing.

I claim:

In a centrifugal clutch adapted for use between two rotatable members, a number of radially extending wings affixed to one of said members and adapted to take a non-variable position in relation thereto, a casing affixed to the other of said members in a position so as to surround but not to contact with the said wings, such casing having an oval interior cross sectional shape, and a pulverous substance positioned in the said casing and adapted to form an intermediate transmission means between the same and the wings surrounded thereby.

JOHAN ANSHELM GRANSTEDT.